United States Patent [19]

Moschner et al.

[11] Patent Number: 4,653,196
[45] Date of Patent: Mar. 31, 1987

[54] DEVICE FOR MEASURING THE PROFILE SHAPE OF CYLINDRICAL WORKPIECE SURFACES

[75] Inventors: Erich Moschner; Engelbert Gruber, both of Zolling; Karlheinz Herborg, Mainburg, all of Fed. Rep. of Germany

[73] Assignee: Elgema GmbH, Fed. Rep. of Germany

[21] Appl. No.: 893,556

[22] Filed: Jul. 15, 1986

[51] Int. Cl.[4] ............................................. G01B 7/28
[52] U.S. Cl. ..................................... 33/552; 33/557; 33/143 L; 33/178 E
[58] Field of Search ................. 33/551, 552, 553, 557, 33/560, 143 L, 178 R, 178 E

[56] References Cited

U.S. PATENT DOCUMENTS

| | | | |
|---|---|---|---|
| 3,206,857 | 9/1965 | Kaye | 33/553 |
| 3,857,185 | 12/1974 | Hoglund | 33/553 |
| 3,939,567 | 2/1976 | Albertazzi | 33/143 L |
| 4,167,066 | 9/1979 | Cooper et al. | 33/552 |
| 4,233,744 | 11/1980 | Possati | 33/178 E |
| 4,326,338 | 4/1982 | Plante | 33/560 |
| 4,355,467 | 10/1982 | Albertazzi | 33/143 L |
| 4,555,855 | 12/1985 | Gounelli et al. | 33/178 E |

Primary Examiner—Willis Little
Attorney, Agent, or Firm—Sughrue, Mion, Zinn, Macpeak, and Seas

[57] ABSTRACT

A device for measuring the profile shape of workpieces having cylindrical surfaces comprises a sensing device and a electronic evaluation circuit connected to the sensing device. During the measurement there is relative displacement between the workpiece and the sensing device. For the simultaneous measurement of a plurality of offset cylindrical surfaces of the workpiece, the sensing device is provided with a corresponding plurality of measuring sensors which are angularly offset from one another, viewed in the direction of rotational measurement, and which are adjustable in the axial and radial directions independently of each other. An angular step transmitter is provided to supply angular step signals for the trains of tracking signals from the measuring sensors and to generate a reference angle signal. In the evaluation circuit there is provided for the measuring sensors a phase rotation device by means of which the individual trains of as-measured tracking signals from the measuring sensors are rotationally phased in order to simulate a linear arrangement of the measuring sensors.

7 Claims, 12 Drawing Figures

DEVICE FOR MEASURING THE PROFILE SHAPE OF CYLINDRICAL WORKPIECE SURFACES

This invention relates to a device for measuring the profile shape of cylindrical workpiece surfaces, comprising sensing means arranged to contact these surfaces, an electronic evaluation circuit connected to the sensing means, drive means for effecting relative movement of the workpiece and the sensing means during the measurement, and support means for the workpiece.

From British patent application GB-A-2126730 there is known a measuring device for determining the diameter of bores in an electronic manner. This known measuring device comprises three measuring sensors offset in a star-shaped array and which are pulled through a single bore to determine its diameter. The deflection and measurement results are evaluated electronically.

This known measuring device has the disadvantage that it comprises three measuring arms and measuring sensors for the determination of the diameter, and also that with this known device it is not possible simultaneously to measure a plurality of profiles.

From U.S. patent specification No. 3,206,857 a test instrument is known by means of which, using three measuring sensor feelers with a triangulation technique, the position of bores in a workpiece can be determined. The accurate positional determination is effected, on the basis of the measured values, in an electronic evaluation circuit. For the measurement, the measuring feelers of the measuring sensor device are rotated in the bore about the axis of the measuring sensor device. This known measuring device likewise has the disadvantage that three measuring feelers are used and that a plurality of bores or profiles cannot be measured simultaneously.

The known measuring devices work upon the principle of the slide gage or micrometer screw, in which at least two measuring feelers or measuring surfaces must likewise be provided.

It is an object of the present invention to provide a measuring device of the type first referred to above which, for the determination of the profile shape of cylindrical workpiece surfaces, is of simpler construction than heretofore and which permits the measurement of one surface or of several surfaces simultaneously. In this way, errors which, with conventional measuring devices, arise because the measuring sensors must be displaced axially for determining and re-creating a surface or several surfaces of a workpiece, should be avoided. Also, according to the invention, the accurate determination of the diameter and the axes of such surfaces is made possible.

These objects are achieved in accordance with the present invention in that the sensing device, for the simultaneous profile shape measurement of a plurality of offset cylindrical surfaces of the workpiece, comprises a corresponding plurality of measuring sensors which are offset angularly in the direction of rotational measurement and which are adjustable independently of one another, said sensors each being arranged to produce a train of tracking signals, in that an angular step transmitter is provided for the supply of angular step signals for the train of tracking signals of each measuring sensor and for the generation of a reference angle signal, and in that in the evaluation circuit for the measuring sensors there is provided a phase rotation device by means of which the individual trains of tracking signals from the measuring sensors are rotated in a phased manner in order to simulate a linear arrangement of the measuring sensors.

In an advantageous way, for the determination of one profile shape of a cylindrical workpiece, one measuring sensor can be used which, in co-operation with the angular step transmitter, produces one train of sensor tracking signals for one channel. For this, the workpiece can suitably be mounted on the support means and by means of the drive means set into rotation. The associated measuring sensor then determines, within the cycle of the angle signals from the angular step transmitter, tracking measurement signals which form a train of real-value tracking signals for the relevant surface.

For simultaneous determination of a further train of tracking signals from a further surface of the workpiece, preferably an offset cylinder surface, which should be aligned axially with the first-mentioned cylinder surface, or which is an outer or inner surface co-axial with respect to an inner or outer surface; the same procedure is carried out. The same applies for further cylinder surfaces. Also, two measuring sensors for example offset by 180° can be displaced simlutaneously from one plane on a cylindrical surface.

For low cost and simple construction of the measuring device the individual measuring sensors are preferably arranged offset angularly relative to each other. By this means one achieves the advantage that closely stepped cylindrical surfaces which are offset only slightly inwardly and/or outwardly of each other can be measured simultaneously. Depending upon the length of the individual cylindrical surface offsets in the case of internal bores and/or external surfaces, the individual measuring sensors can be adjusted accordingly both in the radial direction and also in the axial direction.

With the aid of the phase rotation device in the evaluation circuit the spatial angular offset of the individual measuring sensors can be re-calculated in a phased manner, such that a linear arrangement of the individual measuring sensors is simulated. This gives the advantage that tracking signal trains are produced with reference to a common start line in spite of spatial offsets of the individual measuring sensors. This simplifies not only the computation, but also the possibilities for adjustment and reading out of information relevant to lack of roundness, faults in the profile shape, and deviations from the center-point and axes.

This measuring device can therefore be put into practical use in an advantageous manner in the following way.

With the help of the measuring devicee of the present invention, the skew position of a workpiece can be determined if at least two measuring sensors are used simultaneously. For this, first of all, the roundness profile of the workpiece is determined by simultaneous measurement of two trains of signals without the measuring sensors being axially displaced. Next, the center-point of the shape profile circle of the one and of the other measured surface are calculated. Next, from the identifying data of the two center-points a theoretical workpiece axis is calculated. By determining and by knowledge of the actual rotational axis of the workpiece, which rotates for example together with the rotatable portion of the support means, one can, with the aid of the evaluation circuit, ascertain the eccentricity and coaxiality and amount of offset of the axis, both in terms of magnitude and angle.

With the aid of the measuring device of the present invention one can also determine and calculate different axes in the measurement of workpieces. In the case of a workpiece with three profiles, first of all, in the course of receiving the tracking signals, the axis is determined theoretically from the first two profiles, by initially determining the center-points of the two profiles and then connecting these center-points to each other. In order then to determine the offset of the center-point of the third profile relative to the axis of the first two profiles, one requires at least three measuring sensors. For this, initially, the offset of the first two profiles relative to the axis of rotation of the support means is determined. Next, the offset of the axis passing through the center-points of the first two profiles is calculated with reference to the center-point of the third profile. In order to determine the position of the center-point of the third profile relative to the axis of the first two profiles, the offset of the center-point of the third profile from the center-point of the support means is subtracted from the offset of the axis of the first two profiles from the axis of rotation of the support means.

A further possibility of using the measuring device is in the determination of the position of two axes of a workpiece which are to be brought into alignment. For this one needs at least four measuring sensors. Using each pair of measuring sensors one first determines the position of the two axes in question relative to the so-called rotary table axis or axis of the support means. From this the included angle between these two axes, and the offset from the axis of the support means, are determined. This determination is preferably carried out in a computer. The computed result is then preferably presented on an image screen. Alternatively, the computed result can be reproduced from a printer or by a plotter. By determining the offset of the two workpiece axes, one can subsequently, in the course of machining or setting up the workpiece, produce a linear alignment of these axes.

Because of its small space requirements, the measuring device of the present invention is particularly well suited for the rapid measurement of boreholes having small diameters and large depths. Also, the measuring device is suitable for the determination of the external roundness of workpieces, particularly of cylindrical shape. In order to optimise the evaluation of the measured results, a plurality of measuring sensors are arranged on a circle round a workpiece, either in one plane, in which case then the measuring sensors must be displaced for the measurement process, or alternatively in different planes.

The measuring device of the present invention is not only suitable for the determination of axes of cylinder portions which are to be brought into alignment, but also for the measurement of a plurality of bearings or shafts which lie one behind another. In this case, first of all, the theoretical axis between two cylinder center-points is constructed, whereafter further determined axes are then related to the first-mentioned axis. By using the angle step transmitter there is the advantage that after determining the starting angle position each measuring point of the measuring sensors can be calculated and the value fully recalled. If there is an offset between one cylinder center-point of the workpiece and the axis of the rotary table or the axis of the workpiece support means, then this offset can be determined by determining the minimum and maximum measured values and be determining whether this offset repeats every half period. Typically, for such an offset of axes, the repetition of a minimum or maximum measured value occurs with a period which corresponds to the period of rotation of the workpiece. Also, the device of the present invention is suitable for the measurement of the bending of long shafts, in which for example the two end points of the shaft are first determined and then any number of intermediate points can be measured.

According to a preferred feature of the present invention, the measurement signals from the measuring sensors are processed, rotationally phased and stored in a computer.

In a preferred embodiment, each measuring sensor has associated therewith a shift register in which the phased displacement of the trains of tracking signals takes place, and wherein the number of storage spaces in each shift register corresponds to the number of angular steps per revolution.

According to a further embodiment of the invention, four measuring sensors are provided which are arranged in a star-shaped array on a carrier and which are displaceable relative to one another, with the measuring sensors being directed radially outwardly and/or inwardly.

Consequently, the measuring sensors, in their central position, lie as close as possible to each other.

According to a preferred embodiment of the invention, a carrier is provided which comprises two discs which are rotatable relative to one another, one of these discs being provided with a predetermined number of grooves which corresponds to the number of measuring sensors which are used, and the other disc having a helical groove in the surface facing the one disc.

In a preferred arrangement, the measuring sensors are connected to the carrier by means of link members so as to be radially adjustable, and the link members are guided in the grooves of the one disc and engage in the spiral groove.

Preferably, in the evaluation circuit, displacement measuring stages are associated with the individual measuring sensors.

A number of embodiments of device in accordance with the invention will now be described by way of example and with reference to the drawings.

In the drawings

Figure 1:
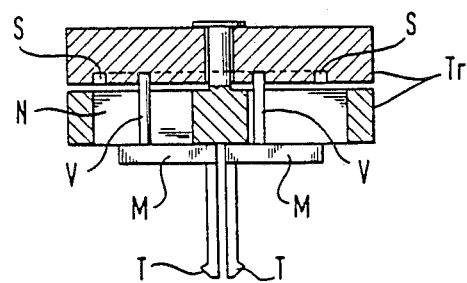
FIG. 1 is a sectional view through a measuring device.
Figure 2:
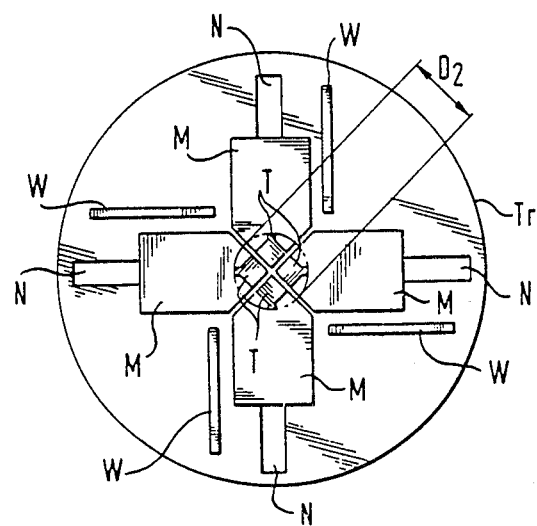
FIG. 2 is a cross-sectional view of the measuring device.

Referring first to FIG. 1, a carrier is indicated at Tr, which consists of two discs which are connected to one another, with the lower disc having four grooves N and with the upper disc having a confronting spiral groove S in its underside. Measurement detectors M and their associated measuring sensors T are radially displaceable by means of regulating members V upon rotation of the two discs relative to one another, by virtue of the regulating members V being guided by the grooves N and engaging in the confronting spiral groove S. Associated with each of the measurement detectors M is a displacement measuring device W, as can be seen from FIG. 2.

Figure 4:
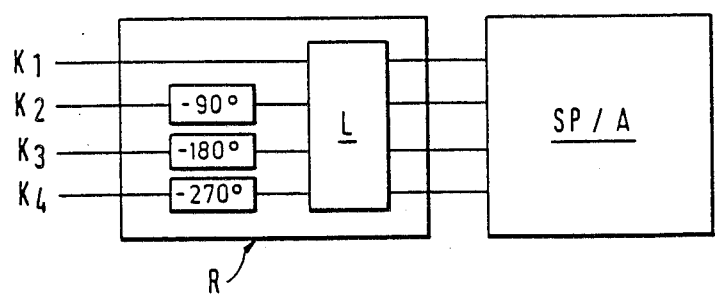
FIG. 4 shows an evaluation circuit.

The measurement signals yielded by these displacement measuring units W are processed further in an associated computer means, of the type shown in FIG. 4, for determining the diameter values.

The tracking signals which are supplied by the measurement detectors M are processed in the computer, indicated at R, in accordance with the geometrical position of the respective measuring sensors T. The individual measurement signals of the individual tracking signal trains are indicated at K1 to K4. The tracking signals are also rotated, corresponding to the geometrical angular position of the individual measuring sensors, relative to a reference or starting angle, so that the individual tracking signal trains are brought to a phase position which corresponds to a linear or aligned arrangement of the measuring sensors. In this way one achieves a simulation of linearly arranged measuring sensors relative to a measuring or reference line.

Compensation for the different lengths of the individual measuring sensors can be effected in the computer stage indicated at L. Finally, the individual signal values of the signal trains are fed to a store SP and are displayed on a display instrument, for example on a monitor A.

Figure 3:
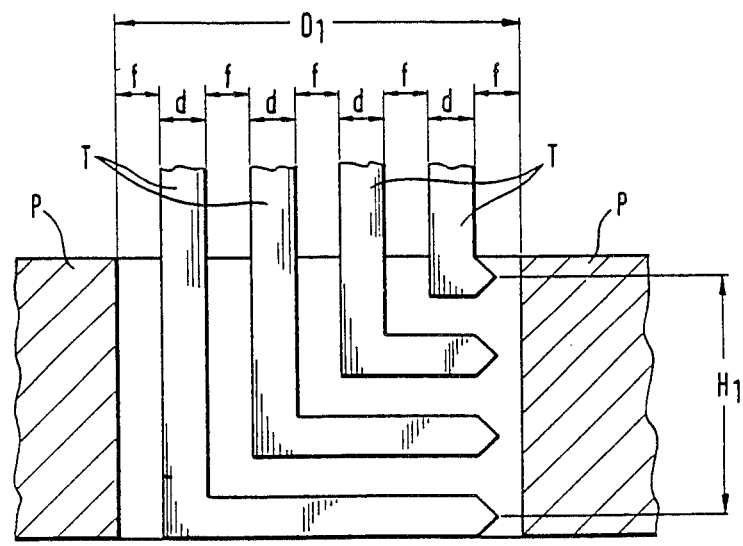
FIG. 3 is a schematic illustration of four measuring sensors operating on different tracks.

FIG. 3 shows four measuring sensors which are positioned one above another and which are arranged to contact a single surface of a workpiece. By having the four measuring sensors T positioned one above another and thus operating simultaneously in four different planes, the minimum attainable diameter D1 of the bore of the workpiece P to be measured is taken, from the individual diameters d of the measuring sensors and from the spacings f between the adjacent measuring sensors, to be given by the equation:

$$D1 = 4d + 5f$$

The minimum depth H1 of the workpiece P to be measured is then given by the formula:

$$H1 = 3d + 3f$$

With a star-shaped arrangement of measuring sensors the minimum diameter D2 (FIG. 2) is given by the formula:
$$D2 = 2d + 3f$$

Figure 5:
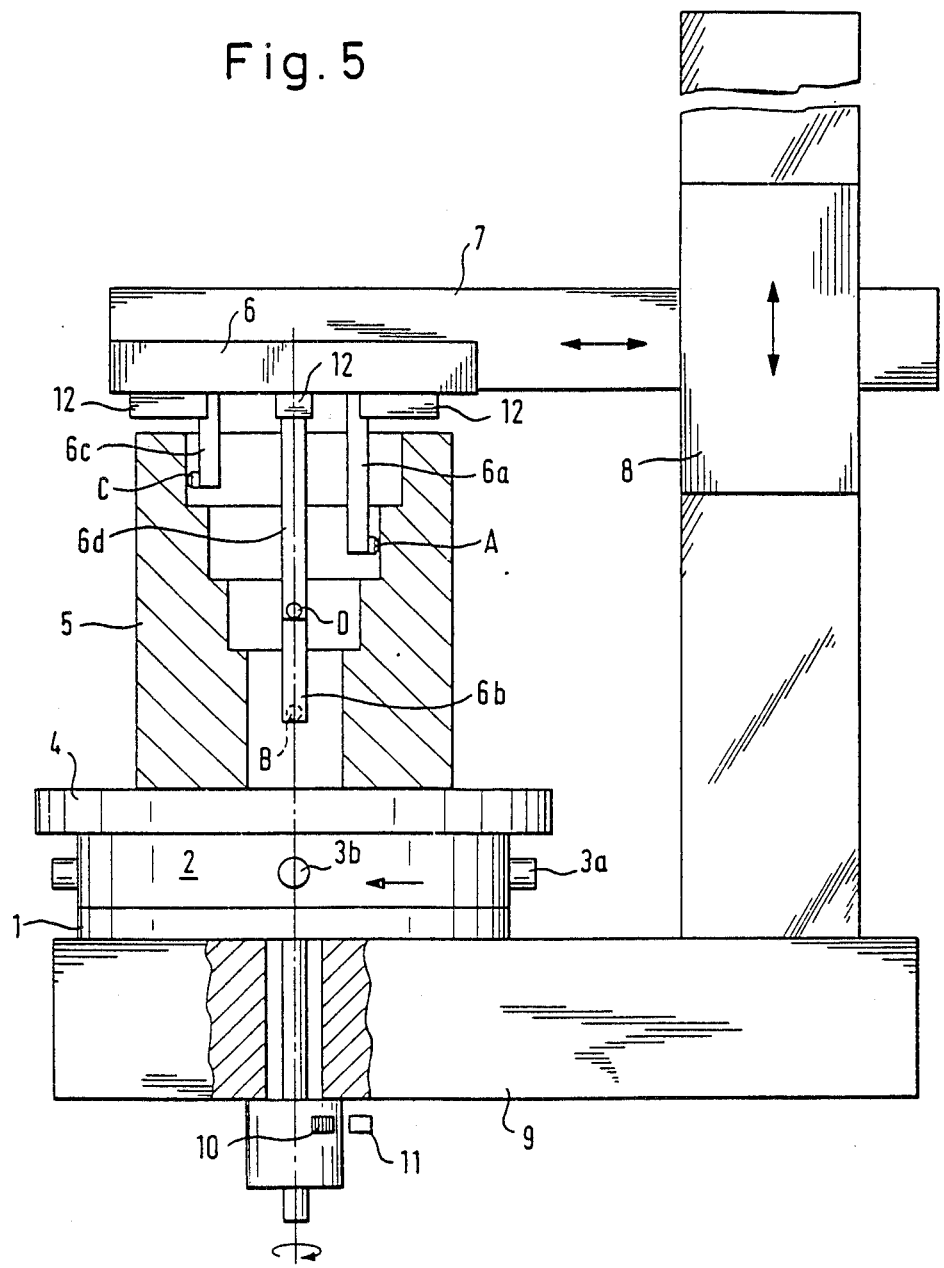
FIG. 5 is a schematic illustration of a further measuring device in accordance with the invention.

In FIG. 5 there is shown a rotary table mounting 1 for a workpiece 5. This rotary table mounting is positioned on a base 9 of a measuring device. At 2 there is indicated a centering and levelling device which includes adjustment knobs 3a and 3b for centering and levelling. On this centering and levelling device there is located a support plate 4 on which the workpiece is mounted. In the present case, the workpiece 5 has four offset counterbores which are aligned on a common axis.

At 6 is indicated a multiple sensing head which is arranged on a horizontal measuring head holder 7. At 8 is indicated a vertical measuring guide which is mounted on the base 9 of the measuring device. The measuring head holder 7 is horizontally displaceable. Additionally, the measuring head holder 7 is vertically displaceable in the vertical measuring guide. At 6a, 6b, 6c and 6d are indicated measuring sensor arms which are radially shiftable by way of their respective measurement detectors 12 and which are also axially adjustable. At the ends of these individual measuring sensor arms are located radially outwardly directed measuring sensors A, B, C and D.

At 10 there is indicated an angular step transmitter which produces an appropriate angle signal per angular step. Reference numeral 11 indicates a starting or zero mark which is used in conjunction with a corresponding transmitter portion of the rotating angular step transmitter, in such a way that a definite starting angle pulse is generated for each rotation of the rotary table. In the present case, this starting angle signal is generated when the adjustment knob indicated at 3a is located in the plane of the drawing, in which plane the transmitter 11 also lies. The angular step transmitter is sufficiently finely subdivided that the individual angular step signals form a sufficiently sensitive and finely-divided tracking signal train. With the aid of the zero-position recognition means one can consequently obtain an accurately defined position of the rotary table.

Figure 6:
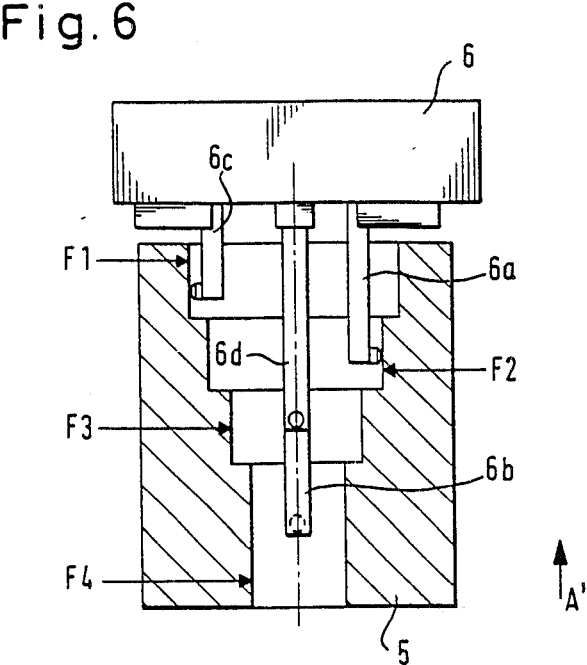
FIG. 6 is a sectional view through a measuring head and workpiece.
Figure 7:
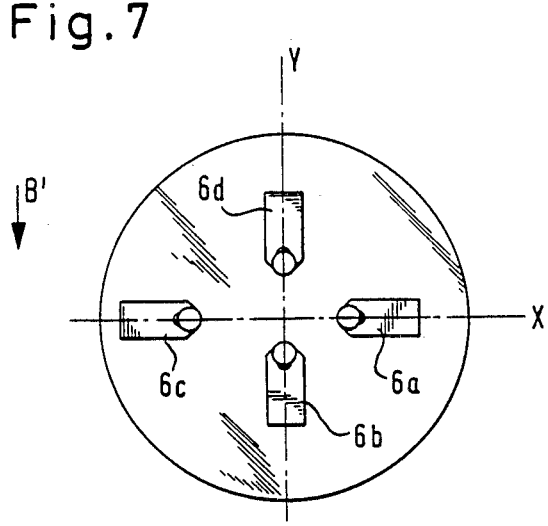
FIG. 7 is an end view of the measuring head.

In FIG. 6 there is shown the measuring head 6 with the individual measuring sensor arms 6a to 6d, as well as the four surfaces F1 to F4 which are to be measured. The individual measuring sensors are set at different tracking radii. The different angular offsets of the individual measuring sensors can be seen in FIG. 7, where, in the present case, there is an angular offset of 90° between each pair of adjacent sensors.

Figure 8:
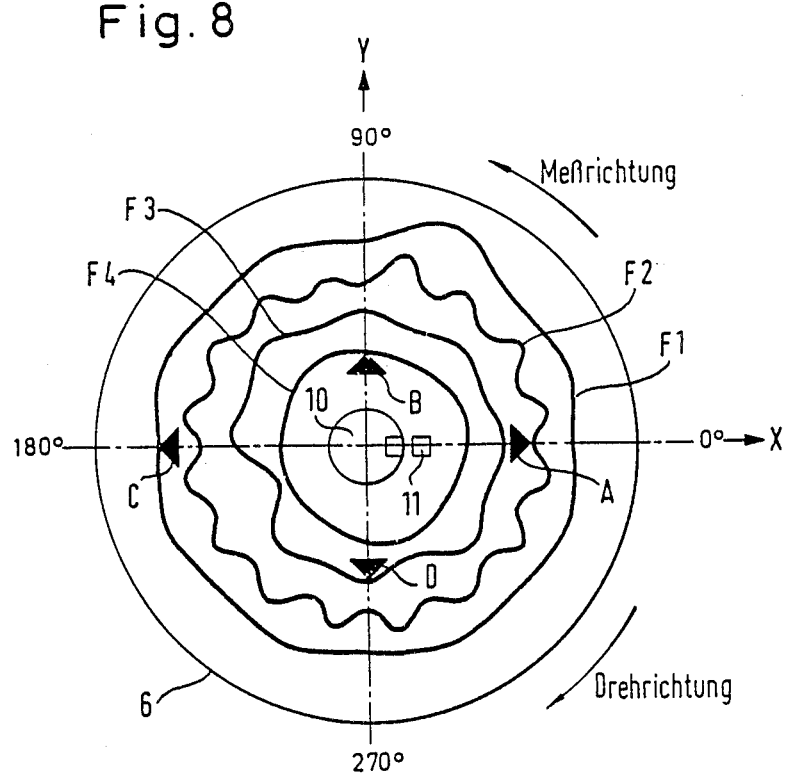
FIG. 8 shows four generally cylindrical workpiece profiles of a workpiece.

From FIG. 8 one can appreciate how the individual measuring sensors A to D are arranged on the generally circular surfaces of the workpiece 6 which are to be measured.

Figure 9:
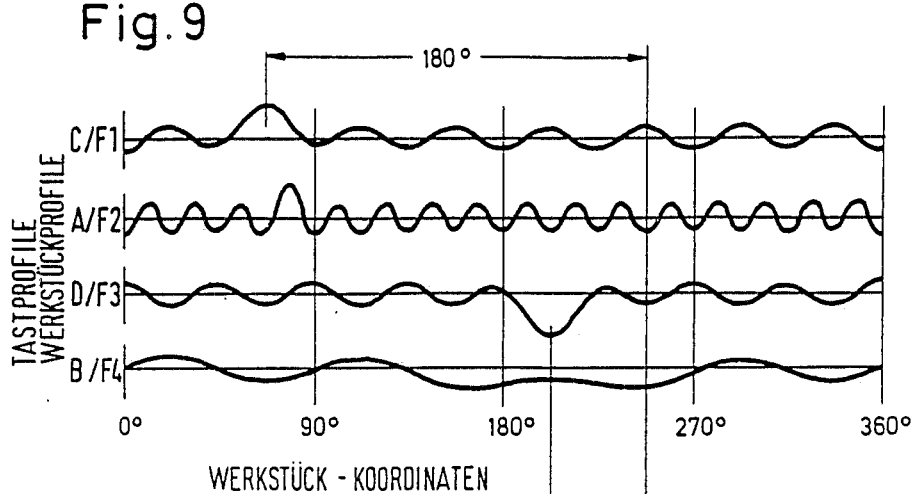
FIGS. 9 to 11 show signal traces representative of the sensor tracking profiles, workpiece profiles, the as-measured sensor tracking profiles and the phase-corrected sensor tracking profiles; and, FIG. 12 illustrates data stores for the signal trains of the sensor tracking profiles.
Figure 10:
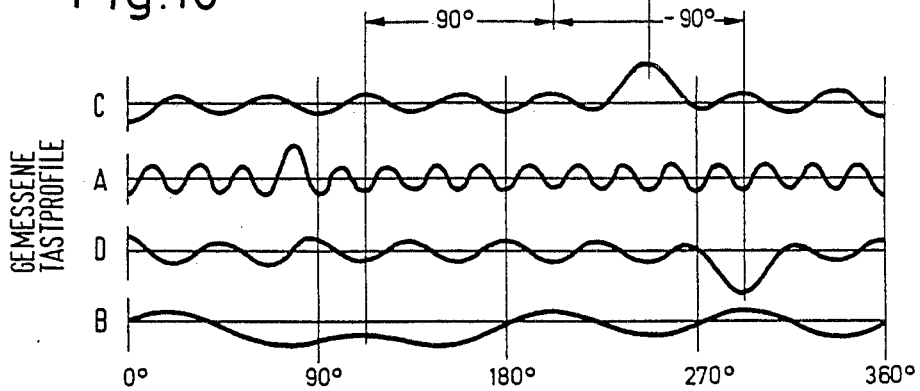
Figure 11:
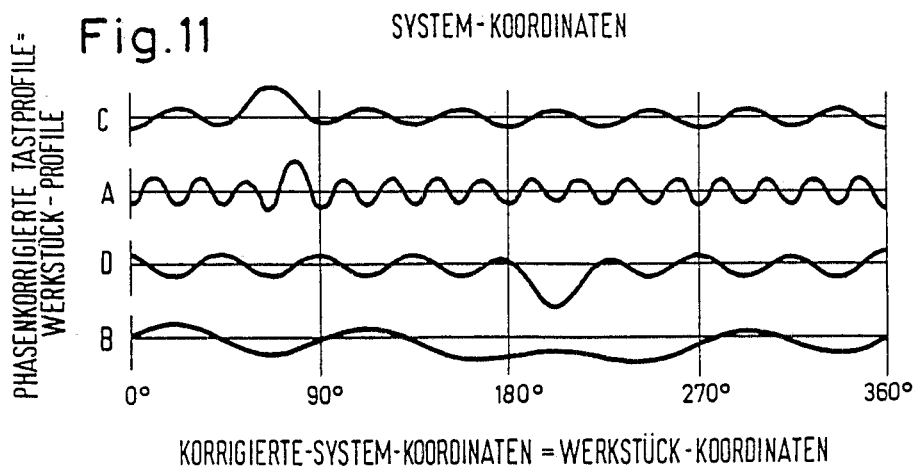

FIGS. 9 to 11 show not only the sensor tracking profiles and workpiece profiles but also the as-measured sensor tracking profiles and the phase-corrected sensor tracking profiles.

From these Figures it can be seen that the phase differences between the workpiece profiles and the as-measured sensor tracking profiles are as follows:

A phase displacement of 180° for the surface F1 and measuring sensor C, a phase displacement of +90° for the measured surface F4 and measuring sensor B, a phase displacement of −90° for the measured surface F3 and measuring sensor D, and a phase displacement of 0° for the measured surface F2 and measuring sensor A. These angular offsets are also clearly apparent from FIG. 8. The zero or starting angular step lies in the direction of the X-axis or in the direction of the adjustment knob 3a.

In FIG. 11 the phase rotation is shown as having already been carried out such that there is correspondence with the signal traces shown in FIG. 9. Accordingly, the corrected system coordinates are the same as the workpiece coordinates. The workpiece with its own characteristic coordinate system therefore rotates during the measurement relative to the coordinate system of the base of the measuring device. By the unequivocal determination of the zero measuring angle signal, each point on the received measurement signal train bears an unequivocal angular relationship to this zero signal. In the embodiment shown in FIGS. 8 to 11 it will be appreciated that at the start of the measurement the two coordinate systems, namely the coordinate system of the workpiece and the coordinate system of the measuring table, lie superimposed on one another. The spatial starting point of the measurement in the workpiece coordinate system varies from measuring sensor to measuring sensor, according to the angular offset of the measuring sensors with respect to each other. In this way, upon reading in the tracking data over the associated rotary angular step values for the individual surfaces to be measured, one obtains a corresponding phase offset which then, as mentioned above, is eliminated in the evaluation computer circuitry by phase rotation. This is achieved by the individual phase-displaced signal trains being transferred from a first store into a further store with corresponding phase displacement. An alternative possibility would be to arrange that each signal train has a so-called index marker associated with it.

Figure 12:
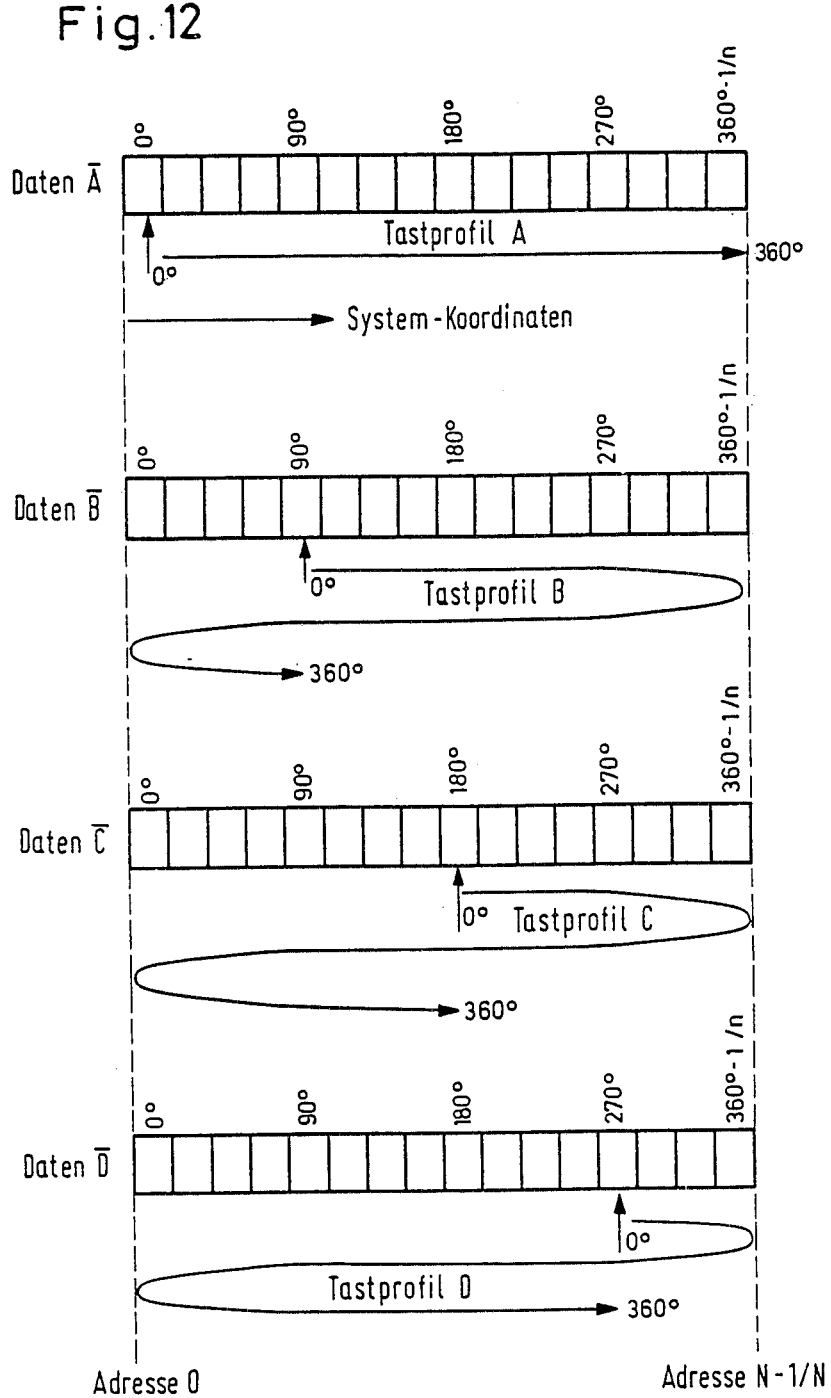

FIG. 12 shows the cycle of the tracking signal trains for the individual measuring sensors. The individual angularly-offset measuring sensor signal steps are shown set in relationship to the rotary table system coordinates, whereby one achieves a true tracking signal train for the workpiece surfaces with reference to the zero mark of the zero transmitter 11. According to the four representations for the four measurement surfaces F1 to F4 (data A to D) an angular offset of 90° is given successively for the four sensors. The individual stores contain storage space groups of the data stores. The looped arrows for the individual sensor tracking profiles A to D indicate in which sequence the measuring sensor signals must be put in the respective measurement stores in order to obtain an accurate phase position of the measuring sensor profiles.

The phase correction in the measurement stores is effected, as already described above, by cyclic transfer of the individual measured values of each measuring sensor signal train, in the manner of a shift register. Alternatively, the phase correction can be effected, in a simple way, by providing in the measured value stores cyclic index values corresponding to the phase offset and representing the shift to be effected.

We claim:

1. A device for measuring the profile shape of cylindrical workpiece surfaces, comprising sensing means arranged to contact the surfaces, an electronic evaluation circuit for connection to the sensing means, drive means for effecting relative displacement of the workpiece and the sensing means during the measurement, and support means for the workpiece, characterised in that the sensing means comprises, for the simultaneous profile shape measurement of a plurality of offset generally cylindrical surfaces of the workpiece, a corresponding plurality of measuring sensors which are angularly offset in the direction of rotational measurement and which are adjustable in the axial and radial directions independently of one another, said sensors being arranged each to supply a train of tracking signals, an angular step transmitter is provided to supply angular step signals for the train of tracking signals of each measuring sensor and for the generation of a reference angle signal, and a phase rotation device is provided in the evaluation circuit for the measuring sensors, the individual trains of tracking signals from the measuring sensors being rotated in the phase rotation device in a phased manner in order to simulate a linear arrangement of the measuring sensors.

2. A device according to claim 1, which includes computer means in which the measurement signals from the measuring sensors are processed, rotationally phased and stored.

3. A device according to claim 1, in which each measuring sensor has associated therewith a shift register for the phased displacement of the train of tracking signals, the number of storage spaces in the shift register corresponding to the number of angular steps per revolution.

4. A device according to claim 1, which comprises four measuring sensors which are arranged in star formation on a carrier for displacement relative to one another, the sensors being directed radially outwardly and/or inwardly.

5. A device according to claim 4, in which the carrier comprises two discs which are rotatable relative to one another, one of said discs being provided with a plurality of grooves equal in number to the number of measurement detectors which are used, and the other of said discs being provided with a spiral groove facing said one disc.

6. A device according to claim 5, in which the measuring sensors with their measurement detectors are connected to the carrier for radial displacement relative thereto by means of link members which are guided in said grooves and engage in said spiral groove.

7. A device according to claim 5, which includes displacement measuring units associated with the individual measurement detectors.

* * * * *